United States Patent
Angelskar

(10) Patent No.: US 8,118,930 B2
(45) Date of Patent: Feb. 21, 2012

(54) SETTING ACCELERATOR FOR SPRAYED CONCRETE

(75) Inventor: Terje Angelskar, Berg Dietikon (CH)

(73) Assignee: Construction Research & Technology GmbH, Trostberg (DE)

( * ) Notice: Subject to any disclaimer, the term of this patent is extended or adjusted under 35 U.S.C. 154(b) by 815 days.

(21) Appl. No.: 11/658,549

(22) PCT Filed: Jun. 16, 2005

(86) PCT No.: PCT/EP2005/006442
§ 371 (c)(1),
(2), (4) Date: May 2, 2007

(87) PCT Pub. No.: WO2006/010407
PCT Pub. Date: Feb. 2, 2006

(65) Prior Publication Data
US 2008/0090016 A1 Apr. 17, 2008

(30) Foreign Application Priority Data
Jul. 28, 2004 (GB) .................................. 0416791.2

(51) Int. Cl.
C04B 22/14 (2006.01)
(52) U.S. Cl. ......... 106/727; 106/819; 106/823; 427/427
(58) Field of Classification Search .................. 106/596, 106/724, 727, 823, 819
See application file for complete search history.

(56) References Cited

U.S. PATENT DOCUMENTS

| | | |
|---|---|---|
| 4,473,405 A | 9/1984 | Gerber |
| 4,507,154 A | 3/1985 | Burge et al. |
| 4,559,243 A | 12/1985 | Passier et al. |
| 4,647,600 A | 3/1987 | Kawahara et al. |
| 4,836,855 A | 6/1989 | Caillau et al. |
| 5,211,751 A | 5/1993 | Arfaei et al. |
| 5,560,774 A | 10/1996 | Buerge et al. |
| 5,605,571 A | 2/1997 | Buerge et al. |
| 5,895,688 A | 4/1999 | Bertoncini et al. |
| 5,935,318 A | 8/1999 | Angelskaar et al. |
| 5,997,630 A | 12/1999 | Angelskar et al. |
| 6,200,381 B1 | 3/2001 | Rechichi |
| 6,302,954 B1 * | 10/2001 | Lunkenheimer et al. ..... 106/727 |
| 6,367,550 B1 | 4/2002 | Chatterji et al. |
| 6,537,367 B2 | 3/2003 | Sommer et al. |
| 6,540,826 B2 | 4/2003 | Sommer et al. |
| 6,692,564 B2 * | 2/2004 | Hofmann ...................... 106/696 |
| 6,723,163 B1 * | 4/2004 | Hofmann ...................... 106/727 |
| 7,037,369 B2 * | 5/2006 | Angelskaar .................. 106/823 |
| 7,182,808 B2 | 2/2007 | Angelskaar et al. |
| 7,198,669 B2 | 4/2007 | Angelskaar et al. |
| 7,381,264 B2 | 6/2008 | Angelskaar |
| 7,585,270 B2 * | 9/2009 | Doumbos et al. ............ 588/256 |
| 2002/0035952 A1 | 3/2002 | Sommer et al. |
| 2003/0078390 A1 | 4/2003 | Paesen et al. |
| 2004/0255825 A1 * | 12/2004 | Angelskaar .................. 106/823 |
| 2006/0048685 A1 | 3/2006 | Angelskaar et al. |
| 2006/0137576 A1 | 6/2006 | Angelskaar et al. |
| 2006/0210716 A1 | 9/2006 | Angelskaar et al. |

FOREIGN PATENT DOCUMENTS

| | | |
|---|---|---|
| EP | 0 465 991 A1 | 1/1992 |
| EP | 0 508 158 A2 | 10/1992 |
| EP | 0 798 300 | 10/1997 |
| EP | 0 812 812 A1 | 12/1997 |
| GB | 650745 | 2/1951 |
| JP | 2000-185952 A | 4/2000 |
| JP | 2001-130935 A | 5/2001 |
| JP | 2002-047048 A | 12/2002 |
| JP | 2003-246659 A | 2/2003 |
| WO | WO 96/05150 | 2/1996 |
| WO | WO 00/78688 A1 | 12/2000 |
| WO | WO 01/42165 A2 | 6/2001 |
| WO | WO 03/029163 A2 | 4/2003 |
| WO | WO 03/045872 A1 | 6/2003 |
| WO | WO 2004/106258 A2 | 12/2004 |
| WO | WO 2005/028398 A1 | 3/2005 |
| WO | WO 2005/040059 A2 | 5/2005 |
| WO | WO 2006/074739 A1 | 7/2006 |

OTHER PUBLICATIONS

KR 2004070558 A (Cho et al.) Aug. 11, 2004 abstract only.*
WO 2005075381 (Lindlar et al.)0 Aug. 18, 2005 abstract only.*
International Preliminary Report on Patentability, Form PCT/IB/373, for PCT International Patent Application No. PCT/EP2005/006442 corresponding to U.S. Appl. No. 11/658,549, mailing date Jan. 30, 2007.
English language abstract of JP 2001-130935; Publication Date May 15, 2001; Applicant: Katekkusu: KK.
English language abstract of JP 2002-047048; Publication Date Feb. 12, 2002; Applicant: Denki Kagaku Kogyo KK.
English language abstract of JP 2001-261393; Publication Date Sep. 26, 2001; Applicant: Denki Kagaku Kogyo KK.
English language abstract of JP 52076328A; Publication Date Jun. 27, 1977; Applicant: Musashino Kagaku Ken.
Canadian Office Action, mailed Jul. 6, 2011, for corresponding Canadian Patent Application No. 2,575,146.

* cited by examiner

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

An accelerating admixture for concrete, containing a liquid mixture being an aqueous solution or an aqueous dispersion, wherein a) the liquid mixture contains 13 to 43 weight % dissolved aluminium sulfate, b) the liquid mixture contains less than 1 weight % dissolved carboxylic acid, c) the liquid mixture contains at least 31 weight % water, d) the molar ratio of dissolved aluminium to dissolved sulfate in the liquid mixture is from 0.5 to 10.0.

9 Claims, No Drawings

SETTING ACCELERATOR FOR SPRAYED CONCRETE

CROSS REFERENCE TO RELATED APPLICATIONS

This application is a national stage application of International Application No. PCT/EP2005/006442, filed 16 Jun. 2005, which claims the benefit of Application No. GB 0416791.2, filed 28 Jul. 2004 from which applications priority is claimed.

This invention relates to an accelerating admixture for concrete, to the use of the accelerating admixture and to a layer of hardened concrete.

Sprayed concrete or "shotcrete" which is applied to substrates such as rock surfaces and tunnels by spraying must set very rapidly. In such a use, the traditional concrete accelerators such as calciumchloride are not effective and more powerful accelerators must be used, including sodiumaluminate and alkaline metal hydroxide. These are highly alkaline, which gives rive both to handling difficulties and unpleasant conditions when spraying in confined spaces such as tunnels.

An alternative accelerating technology based on aluminium compounds has been known for some time. The use of aluminium hydroxide either alone or combined with other materials is described in EP-B-0 076 927.

In a variation on this, aluminium hydroxide may be partially reacted with an acid, preferably an organic acid—see, for example EP-A-0 798 300. Aluminium sulfate is also known as a component of accelerating systems, and is described in, for example, EP-B-0 946 451. Another aluminium compound which has been used in concrete accelerators is basic aluminium sulfate (also known as aluminium hydroxysulfate)—see, for example U.S. Pat. No. 5,997,630.

In order to provide a sufficient storage stability accelerating admixtures normally contain ingredients which prevent the precipitation of aluminium salts. Such ingredients are for example carboxylic acids, which are typically used in sufficient amounts to stabilise the corresponding accelerator composition - see, for example EP-B-11 14 004.

The disadvantage of known accelerating admixtures is that they generally do not fulfil all of the following characteristics which are in combination appreciated by the users of accelerating admixtures:
  providing a short setting time,
  having a sufficient storage stability and
  being economical.

Thus, the object of the present invention is to provide an accelerating admixture for concrete which fulfils all of the said characteristics.

The solution of this object is an accelerating admixture for concrete, containing a liquid mixture being an aqueous solution or an aqueous dispersion, wherein
  a) the liquid mixture contains 13 to 43 weight % dissolved aluminium sulfate,
  b) the liquid mixture contains less than 1 weight % dissolved carboxylic acid,
  c) the liquid mixture contains at least 31 weight % water,
  d) the molar ratio of dissolved aluminium to dissolved sulfate in the liquid mixture is from 0.5 to 10.0.

"Dissolved aluminium sulfate" should mean the amount of aluminium sulfate which is in aqueous solution. If the liquid mixture does not contain an equimolar ratio of the both components dissolved aluminium and dissolved sulfate (this might be the case, if other aluminium and sulfate providing soluble salts than aluminium sulfate (salt) itself are used) the basis for the dissolved amount of aluminium sulfate should be the component (aluminium or sulfate) which has the lowest concentration in solution (example: if the concentration of dissolved aluminium is X mol and the concentration of dissolved sulfate is X+1 mol, the concentration of dissolved aluminium sulfate should be X mol).

The term "carboxylic acid" is intended to include also carboxylic acids containing more than one carboxylic function and other functional groups like amino groups (amino acids) or hydroxyl groups (hydroxycarboxylic acids). As carboxylic acids are—depending on the pH-value—often contained in the deprotonated form, the term "carboxylic acid" should also mean carboxylate or a corresponding mixture of carboxylate and carboxylic acid.

Appropriate carboxylic acids are often strong carboxylic acids like formic acid or acetic acid but also amino acids like glycin or asparaginic acid may provide good results.

The water of the liquid mixture may have its origin partly in the crystal water of dissolved salts.

If the liquid mixture is an aqueous dispersion the basis of this mixture is water. The dispersion should not contain more than 15 weight %, preferably not more than 5 weight % not dissolved material (which might be contained at least partly as a bottom layer). Not dissolved parts of the dispersion may be aluminium and sulfate salts (which are in surplus), polymers, impurities and other ingredients. But it is preferred that all aluminium and sulfate salts are dissolved. Generally, an aqueous solution is preferred, because it is easier to handle.

The accelerating admixture according to the present invention fulfils all the three important criteria which are normally appreciated by the customers which are using the accelerators:

The accelerator is economical, provides fast setting times and shows a sufficient stability. A relatively low price of the said accelerating admixture is achieved because it contains only a low amount of the carboxylic acid, which is normally the most expensive component of such an accelerating admixture. Surprisingly such an accelerating admixture provides very often shorter setting times than corresponding admixtures which have a much higher content of carboxylic acid. It should be also emphasised that the accelerating admixture according to the present invention shows a sufficient stability, so that the precipitation of dissolved ingredients is hindered or retarded.

It is possible that after several months or a few years a corresponding aqueous solution develops into a dispersion because dissolved ingredients may precipitate, but also such a dispersion has the advantages of the present invention, because it still contains sufficient dissolved amounts of the corresponding ingredients (especially aluminium sulfate).

Normally the liquid mixture contains 15 to 35, preferably 18 to 32 weight % dissolved aluminium sulfate. The basis for the dissolved aluminium sulfate (solution/ dispersion) might be aluminium sulfate (salt) and/or aluminium hydroxysulfate (salt) which both might contain crystal water or for example aluminium hydroxide and sulfuric acid. The higher the weight % amount of aluminium the higher is normally the performance of the accelerator (short setting time). But if the weight % amount of aluminium is too high it is more likely that the stability of the accelerating admixture deteriorates.

Normally the liquid mixture contains 0 to 0.9 weight % carboxylic acid, for some applications preferably no dissolved carboxylic acid. If the accelerator contains no carboxylic acid the price is normally optimised but it may be an advantage to take also the stability of the admixture into consideration (some applicants might appreciate a long life stability). Then the liquid mixture should normally contain 0.1 to 0.9 weight % dissolved carboxylic acid. But it is generally typical that the molar ratio of dissolved aluminium to dissolved carboxylic acid is at least 7 to 1, more preferably 13 to 1.

In an preferred embodiment of the invention the liquid mixture contains 43 to 76, preferably 51 to 65 weight % water. If too much water is used, the corresponding accelerator admixture provides not sufficient performance (setting times will be too long) but if the content of water is not high enough, the accelerating admixture might not be stable enough.

Mostly the molar ratio of dissolved aluminium to dissolved sulfate in the liquid mixture is from 1.1 to 7.0, preferably from 1.1 to 4.3. Admixtures which have a molar ratio of dissolved aluminium to dissolved sulfate which is greater than 1.1 show very often a better performance than corresponding admixtures which have a lower ratio. But on the other hand an admixture which has a corresponding ratio which is smaller than 7.0 is often more stable than a corresponding admixture which has a higher ratio.

It is preferred that the liquid mixture contains dissolved aluminium hydroxide, wherein it is advantageous that the liquid mixture contains 3 to 35, more preferably 6 to 19 weight % dissolved aluminium hydroxide. The aluminium hydroxide may react with other dissolved ingredients in solution (for example with carboxylic acid) so that it is sometimes impossible to find aluminium hydroxide in solution. The basis for the dissolved aluminium hydroxide can be aluminium hydroxide (salt) itself (preferably amorphous aluminium hydroxide) and basic aluminium sulfate like aluminium hydroxysulfate. All these salts may contain crystal water. The liquid mixture may additionally contain further components which are for example alkanolamines like diethanloamine or triethanolamine or mixtures thereof, polymers, which are preferably not completely dissolved, phosphoric acid, phosphorous acid and corrosion inhibitors which are typically used in sprayed concrete.

In a preferred embodiment the liquid mixture contains except alkanolamines and carboxylic acids no further organic compounds. If alkanolamines are not taken into consideration the liquid mixture contains preferably less than 1 weight % dissolved organic compounds. This provides an improved environmental compatibility, a reduced price of the product and very often a better performance of the accelerator.

In a preferred embodiment the accelerating admixture of the present invention consists of the said liquid mixture. The admixture (the liquid mixture) according to the invention may be manufactured by any convenient means. The order of addition of components is normally not critical. Thus, for example, it is possible and permissible first to react the carboxylic acid (only if carboxylic acid is used) and the aluminium hydroxide (only if aluminium hydroxide is used) to form corresponding aluminium carboxylates and then to add the other components thereto. The mixing/ reaction could be carried out at elevated temperature, no higher than 90 to 95° C. Alternatively, the aluminium hydroxide (if used) may be added last, to a heated mixture of the other components. This is a preferred method.

The admixture of the present invention may be used in an art-recognised manner with sprayed concrete or "shotcrete". The invention therefore provides the use of an accelerating admixture as described above for spraying concrete in a tunnel or in a mine. This means that in a corresponding process a substrate is coated with concrete by preparing a sprayable concrete mix and spraying this mix on the substrate through a nozzle, there being supplied to the mix at the nozzle an accelerating admixture as hereinabove described. The admixture is provided to the nozzle as an aqueous solution or suspension at typically 50 to 60% solids by weight of the suspension, and so that the concrete receives from 0.5 to 25% by weight of admixture (solids on cement). The actual figure used will vary, depending on the type of cement and the mix design, but the provision of a suitable quantity is well within the skill of the art. Thus the pre-nozzle, hardening having been accelerated by the edition at the nozzle of an accelerating amount of an accelerator admixture as hereinabove described.

The invention is further described with reference to the following non-limiting examples:

The following table shows compositions which are accelerating admixtures according to the present invention (compositions number 1b, 1c, 2b and 2c) and comparative accelerating admixtures which are not according to the present invention (compositions number 1a and 2a).

| Composition No. | $H_2O$ | $Al_2(SO_4)_3$ | DEA | $MgCO_3$ | HCOOH | $H_3PO_4$ | $H_3PO_3$ | $Al(OH)_3$ |
|---|---|---|---|---|---|---|---|---|
| 1a | 50.86 | 24.16 | 3.96 | 0 | 5.02 | 0 | 0 | 16 |
| 1b | 55.03 | 24.16 | 3.96 | 0 | 0.85 | 0 | 0 | 16 |
| 1c | 55.88 | 24.16 | 3.96 | 0 | 0 | 0 | 0 | 16 |
| 2a | 49.67 | 26.06 | 0 | 3 | 5.02 | 0.85 | 1 | 14.4 |
| 2b | 53.84 | 26.06 | 0 | 3 | 0.85 | 0.85 | 1 | 14.4 |
| 2c | 54.69 | 26.06 | 0 | 3 | 0 | 0.85 | 1 | 14.4 |

DEA = diethylamine
$Al(OH)_3$ = amorphous aluminium hydroxide
The values in the table are given in weight %

All these accelerating admixtures (1a, 1b, 1c, 2a, 2b and 2c) are clear to opaque solutions which are stable at about 20° C. for at least 8 weeks.

Testing of the Admixture Compositions According to the Above Mentioned Table:

1. Preparing of Mortar Mix for Laboratory Testing

The used mortar was prepared according to SOP 3.3-410032 (based on EN 480).

2. Determination of Setting Time

The setting time was determined according to SOP 3.3-410032 (based on EN 480): the penetration of a cylindrical needle with a diameter of 1.13 mm and a load weight of 300 g in the mortar is measured periodically. Initial setting is said to have taken place when the mortar stiffens sufficiently for the needle to penetrate no deeper than to a point of 4±1 mm from the bottom. Final setting is determined by means of measuring the time from completing of mixing until the needle, gently lowered to the surface of the mortar, no longer penetrates it.

3. Determination of Compressive Strength

Compressive strength tests on mortar specimens have been done according to EN 196-1: the mortar specimens, derived from 40×40×160 mm prisms, were placed on a hydraulic press and the load necessary for rupture measured.

4. Results

Following results were obtained, if the accelerating admixtures according to the table above were used:

| MIX DESIGN | TYPE | | 1a | 1b | 1c | 2a | 2b | 2c |
|---|---|---|---|---|---|---|---|---|
| CEMENT | CEM II 42.5R "Eiberg" | [g] | 450 | 450 | 450 | 450 | 450 | 450 |
| SAND | Normsand EN 196-1 | [g] | 1350 | 1350 | 1350 | 1350 | 1350 | 1350 |
| ADDITIVE | Modified polycarboxylic ether (Glenium 51) | [g] | 1.8 | 1.8 | 1.8 | 1.8 | 1.8 | 1.8 |
| ACCELERATOR | | [g] | 22.5 | | | | | |
| ACCELERATOR | | [g] | | 22.5 | | | | |
| ACCELERATOR | | [g] | | | 22.5 | | | |
| ACCELERATOR | | [g] | | | | 22.5 | | |
| ACCELERATOR | | [g] | | | | | 22.5 | |
| ACCELERATOR | | [g] | | | | | | 22.5 |
| WATER | | [g] | 193.5 | 193.5 | 193.5 | 193.5 | 193.5 | 193.5 |
| W/C [1] | | | 0.43 | 0.43 | 0.43 | 0.43 | 0.43 | 0.43 |
| INITIAL SETTING TIME | | [min] | 2.00 | 2.00 | 2.00 | 2.00 | 2.45 | 2.00 |
| FINAL SET | | [min] | 6.45 | 8.00 | 8.30 | 11.30 | 9.00 | 15.30 |
| COMPRESSIVE STRENGH | 1 DAY | [MPa] | 11 | 14.9 | 20 | 11 | 19.6 | 14.3 |

[1] The W/C ratio (water/cement ratio) has been adjusted to obtain a consistence of 19 ± 1 cm Evaluation of the Results:

The above mentioned results show that all of the accelerating admixtures (1a, 1b, 1c, 2a, 2b, and 2c) provide short initial setting times, short final setting times and high compressive strengths. Also the stability of all tested accelerating admixtures is positive, because all these admixtures (1a, 1b, 1c, 2a, 2b and 3c) are stable at about 20° C. for at least 8 weeks. This means that the use of high amounts of carboxylic acid (more than 1 weight % of the corresponding admixture) does not provide any technical advantage but only the disadvantages that these admixtures which contain a high amount of carboxylic acid (like composition 1a and 2a) are more expensive than the compositions according to the present invention (for example composition 1b, 1c, 2b and 2c). Thus the accelerating admixtures according to the present invention fulfil all of the three criteria: providing a short setting time, having a sufficient storage stability and being economical.

The invention claimed is:

1. An accelerating admixture for concrete, containing a liquid mixture being an aqueous solution or an aqueous dispersion, wherein the liquid mixture consists of:
   a) 15 to 35 weight % dissolved aluminium sulfate,
   b) 0 to 0.9 weight % dissolved carboxylic acid, and
   c) 43 to 76 weight % water.

2. An accelerating admixture according to claim 1, wherein the liquid mixture contains 0.1 to 0.9 weight % dissolved carboxylic acid.

3. A layer of hardened concrete applied by spraying to a substrate via a nozzle, hardening having been accelerated by the addition at the nozzle of an accelerating amount of an accelerator admixture according to claim 1.

4. An accelerating admixture according to claim 1, wherein the liquid mixture contains 18 to 32 weight % dissolved aluminium sulfate.

5. An accelerating admixture according to claim 1, wherein the liquid mixture contains 51 to 65 weight % water.

6. An accelerating admixture according to claim 1, wherein the liquid mixture contains no dissolved carboxylic acid.

7. A process for coating a substrate with a concrete composition comprising
   (a) preparing a sprayable concrete mix;
   (b) spraying the concrete mix on the substrate through a nozzle as a concrete composition;
   (c) supplying to the concrete mix the accelerating admixture of claim 1 at the nozzle to form the concrete composition.

8. The process of claim 7, wherein the accelerating admixture is supplied at 50 to 60% solids by weight of the suspension.

9. The process of claim 7, wherein the accelerating admixture is supplied so that the concrete receives from 0.5 to 25% by weight of solids of admixture based on weight of cement.

* * * * *